(12) United States Patent
Tsukamoto et al.

(10) Patent No.: US 9,684,808 B2
(45) Date of Patent: Jun. 20, 2017

(54) WIRELESS COMMUNICATION APPARATUS AND MOBILE DEVICE

(71) Applicants: Nobunari Tsukamoto, Osaka (JP); Masaaki Tsuji, Osaka (JP); Koji Kawahata, Osaka (JP); Yuusuke Kudoh, Osaka (JP)

(72) Inventors: Nobunari Tsukamoto, Osaka (JP); Masaaki Tsuji, Osaka (JP); Koji Kawahata, Osaka (JP); Yuusuke Kudoh, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/064,300

(22) Filed: Mar. 8, 2016

(65) Prior Publication Data

US 2016/0188924 A1 Jun. 30, 2016

Related U.S. Application Data

(63) Continuation of application No. PCT/JP2014/072126, filed on Aug. 25, 2014.

(30) Foreign Application Priority Data

Sep. 11, 2013 (JP) .................................. 2013-188161
Jul. 15, 2014 (JP) .................................. 2014-144715

(51) Int. Cl.
*H04B 5/00* (2006.01)
*G06K 7/10* (2006.01)
(Continued)

(52) U.S. Cl.
CPC ..... *G06K 7/10237* (2013.01); *G06K 7/10158* (2013.01); *H04B 1/48* (2013.01);
(Continued)

(58) Field of Classification Search
CPC .. H04B 5/0056; H04B 5/0031; H04B 5/0062; H04B 1/48; H04M 1/7253; G06K 7/10158; G06K 7/10237
See application file for complete search history.

(56) References Cited

U.S. PATENT DOCUMENTS

| 6,449,499 B1 | 9/2002 | Ishikura et al. |
| 2005/0079825 A1 | 4/2005 | Omori et al. |

(Continued)

FOREIGN PATENT DOCUMENTS

| JP | H11-168403 | 6/1999 |
| JP | 2005-130442 | 5/2005 |

(Continued)

OTHER PUBLICATIONS

International Search Report Issued on Nov. 18, 2014 in PCT/JP2014/072126 filed on Aug. 25, 2014 (with English translation).

(Continued)

*Primary Examiner* — Ping Hsieh
(74) *Attorney, Agent, or Firm* — Oblon, McClelland, Maier & Neustadt, L.L.P.

(57) ABSTRACT

A wireless communication apparatus includes an amplifier circuit configured to amplify a signal output by a wireless communication unit that executes wireless communication, to output the signal having amplified to a transceiver unit; and a decision unit configured to decide, based on an operational mode of the wireless communication unit, whether to transmit the signal from the transceiver unit via the amplifier circuit, or transmit the signal from the transceiver unit without going via the amplifier circuit.

13 Claims, 10 Drawing Sheets

(51) Int. Cl.
*H04M 1/725* (2006.01)
*H04B 1/48* (2006.01)

(52) U.S. Cl.
CPC ......... *H04B 5/0031* (2013.01); *H04B 5/0056* (2013.01); *H04B 5/0062* (2013.01); *H04M 1/7253* (2013.01); *H04M 2250/04* (2013.01)

(56) References Cited

U.S. PATENT DOCUMENTS

| | | | |
|---|---|---|---|
| 2009/0325488 A1* | 12/2009 | Seol | G06K 7/0008 455/41.2 |
| 2010/0112941 A1 | 5/2010 | Bangs et al. | |
| 2012/0006905 A1 | 1/2012 | Watanabe et al. | |
| 2012/0171952 A1 | 7/2012 | Ohira et al. | |
| 2013/0113561 A1 | 5/2013 | Horiguchi et al. | |
| 2013/0249626 A1* | 9/2013 | Matsunaga | H03F 1/0277 330/51 |
| 2013/0273845 A1 | 10/2013 | Bangs et al. | |
| 2015/0229346 A1 | 8/2015 | Tsuji et al. | |

FOREIGN PATENT DOCUMENTS

| | | |
|---|---|---|
| JP | 2005-244862 | 9/2005 |
| JP | 2009-065426 | 3/2009 |
| JP | 2011-008452 | 1/2011 |
| JP | 2014-075109 | 4/2014 |
| WO | WO 2012/008108 A1 | 1/2012 |
| WO | WO 2012/053086 A1 | 4/2012 |
| WO | WO 2012/098754 A1 | 7/2012 |

OTHER PUBLICATIONS

Written Opinion Issued on Nov. 18, 2014 in PCT/JP2014/072126 filed on Aug. 25, 2014.

Extended European Search Report issued Jul. 11, 2016 in Patent Application No. 14843284.2.

* cited by examiner

| ANTENNA DETECTION | NFC DETECTION | CARD MODE FB | R/W MODE FB | CARD MODE OUTPUT | R/W MODE OUTPUT |
|---|---|---|---|---|---|
| 0 | 0 | 0 | 0 | 0 | 0 |
| 0 | 0 | 0 | 1 | 0 | 0 |
| 0 | 1 | 0 | 0 | 0 | 1 |
| 0 | 1 | 0 | 1 | 0 | 1 |
| 0 | 0 | 1 | 0 | 0 | 0 |
| 0 | 0 | 1 | 1 | 0 | 0 |
| 0 | 1 | 1 | 0 | 0 | 1 |
| 0 | 1 | 1 | 1 | 0 | 1 |
| 1 | 0 | 0 | 0 | 1 | 0 |
| 1 | 0 | 0 | 1 | 1 | 0 |
| 1 | 1 | 0 | 0 | 1 | 0 |
| 1 | 1 | 0 | 1 | 0 | 1 |
| 1 | 0 | 1 | 0 | 1 | 0 |
| 1 | 0 | 1 | 1 | 1 | 0 |
| 1 | 1 | 1 | 0 | 1 | 0 |
| 1 | 1 | 1 | 1 | 1 | 0 |

※ IF BOTH DETECTION ARE ON SIMULTANEOUSLY, OR BOTH FB ARE ON SIMULTANEOUSLY, THEY ARE TREATED AS CARD MODES, RESPECTIVELY.

WIRELESS COMMUNICATION APPARATUS AND MOBILE DEVICE

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2014/072126 filed on Aug. 25, 2014, which is based upon and claims the benefit of priority of the prior Japanese Patent Application No. 2013-188161 filed on Sep. 11, 2013, and the prior Japanese Patent Application No. 2014-144715 filed on Jul. 15, 2014, with the Japanese Patent Office, the entire contents of which are hereby incorporated by reference.

BACKGROUND OF THE INVENTION

1. Field of the Invention

An aspect of the following disclosure relates to a wireless communication apparatus and a mobile device having the wireless communication apparatus.

2. Description of the Related Art

In recent years, mobile devices that are driven by secondary batteries and the like, and capable of short-distance wireless communication by using, for example, RFID (Radio Frequency IDentification) or NFC (Near Field Communication) (for example, Patent Document 1), have become popular. For such mobile devices, downsizing has been desired for antennas that are built-in the devices. However, downsizing an antenna decreases the communication performance due to gain reduction. Therefore, various ideas have been devised for mobile devices in recent years to provide an antenna in a mobile device in minimal space while maintaining the communication performance of the antenna.

However, in many cases, the antenna has a shape that is devised based on the available empty space in the mobile device, and hence, the shape and installation location of the antenna need to be considered for individual mobile devices. Also, if the installation location of the antenna is changed, the impedance changes between the antenna and a circuit at the following stage. Therefore, the impedance needs to be adjusted for individual mobile devices, and the process to attach the antenna is cumbersome.

To solve such problems, the applicant proposes downsizing an antenna while maintaining the communication performance, by providing an amplifier circuit that amplifies a conveyance wave received from the antenna.

RELATED-ART DOCUMENTS

Patent Documents

[Patent Document 1] Japanese Laid-open Patent Publication No. 2009-65426

Incidentally, in case of NFC, there are two operational modes, a card emulation mode and a reader/writer mode (R/W mode). The card emulation mode is a mode in which the device functions as a contactless IC (Integrated Circuit) card. An external reader/writer can read information in the device, and can write information from the reader/writer. The R/W mode is a mode in which the device functions as a reader/writer, to be capable of reading information from the IC card, and writing information into the IC card.

In recent years, devices, such as smart phones, have been proposed in which both the card emulation mode and the R/W mode are available. Such a device can function as a contactless IC card, and can function as a reader/writer.

If the device operates in the card emulation mode, depending on a use case, for example, a ticket gate at a station, the device needs to be recognized by a reader/writer securely within a specified distance. Therefore, to satisfy the specification with a downsized antenna, it is preferable to amplify a signal by using an amplifier circuit to securely transmit the signal. Since a simplex contactless IC card does not have a power source or the like, and operates on power supplied from a reader/writer, it may be difficult to install an additional circuit such as an amplifier circuit. However, for a device such as a smart phone or the like that has its own power source, an additional circuit such as an amplifier circuit can be provided.

If an amplifier circuit is available as such, and the amplifier circuit is also used in the R/W mode, the transmission distance for communication with a counterpart can be securely increased even with a small antenna. However, the R/W mode and the card emulation mode differ from each other in terms of required S/N ratios, bit error rates and the like. Therefore, if attempting to make an amplifier circuit available for the R/W mode in addition to the card emulation mode, problems may arise in that the circuit becomes complex, the circuit size increases, and the cost increases.

SUMMARY OF THE INVENTION

In view of the above, it is a general object of at least one embodiment of the present invention to provide a wireless communication apparatus without increasing the cost of the device.

According to an aspect of the disclosure, a wireless communication apparatus is provided that includes an amplifier circuit configured to amplify a signal output by a wireless communication unit that executes wireless communication, to output the signal having amplified to a transceiver unit; and a decision unit configured to decide, based on an operational mode of the wireless communication unit, whether to transmit the signal from the transceiver unit via the amplifier circuit, or transmit the signal from the transceiver unit without going via the amplifier circuit.

BRIEF DESCRIPTION OF THE DRAWINGS

Other objects and further features of embodiments will be apparent from the following detailed description when read in conjunction with the accompanying drawings, in which.

DETAILED DESCRIPTION OF THE PREFERRED EMBODIMENTS

First Embodiment

Figure 1:
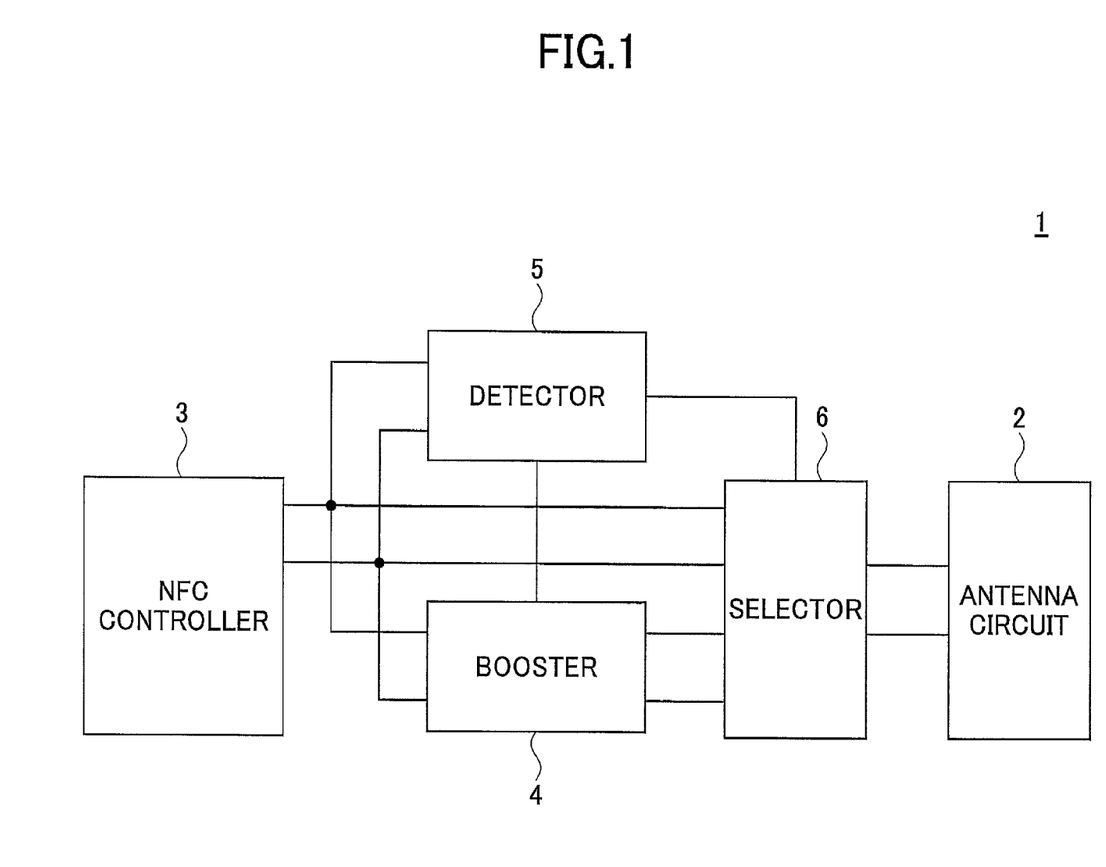
FIG. 1 is a diagram that illustrates an example of a circuit configuration of a wireless communication apparatus according to a first embodiment.
Figure 2:
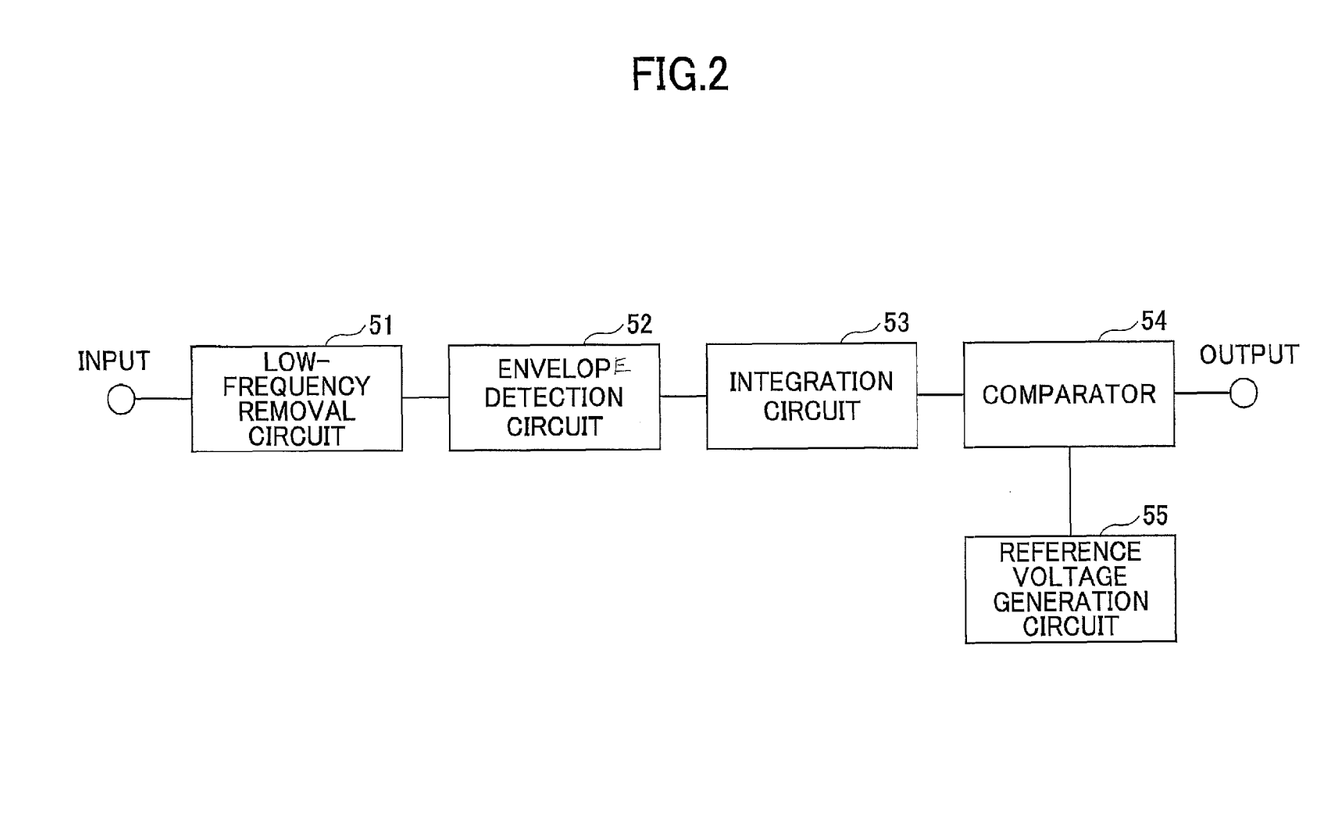
FIG. 2 is a diagram that illustrates an example of a circuit configuration of a detector illustrated in FIG. 1.
Figure 3:
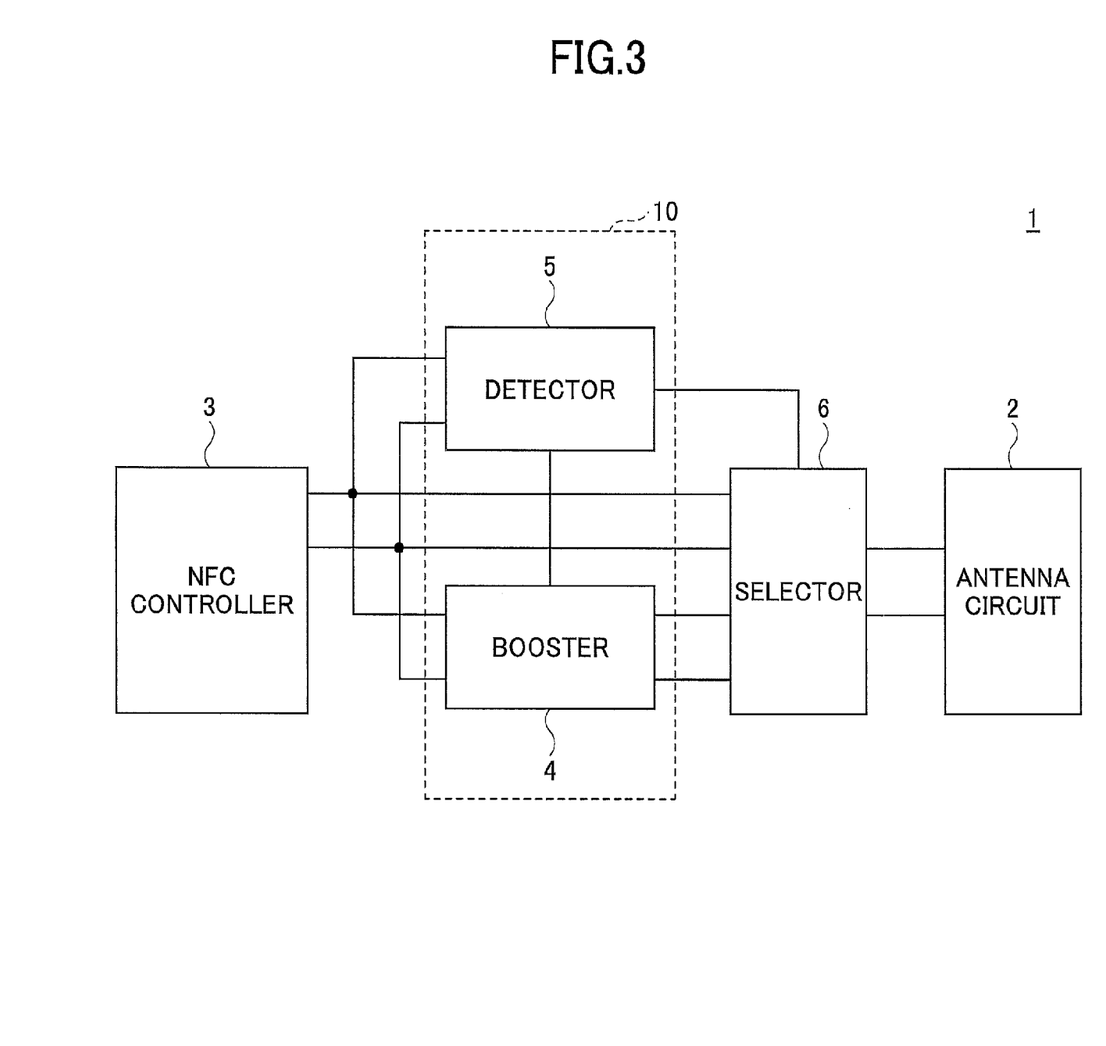
FIG. 3 is a diagram that illustrates the wireless communication apparatus illustrated in FIG. 1 implemented by semiconductor integrated circuits.
Figure 4:
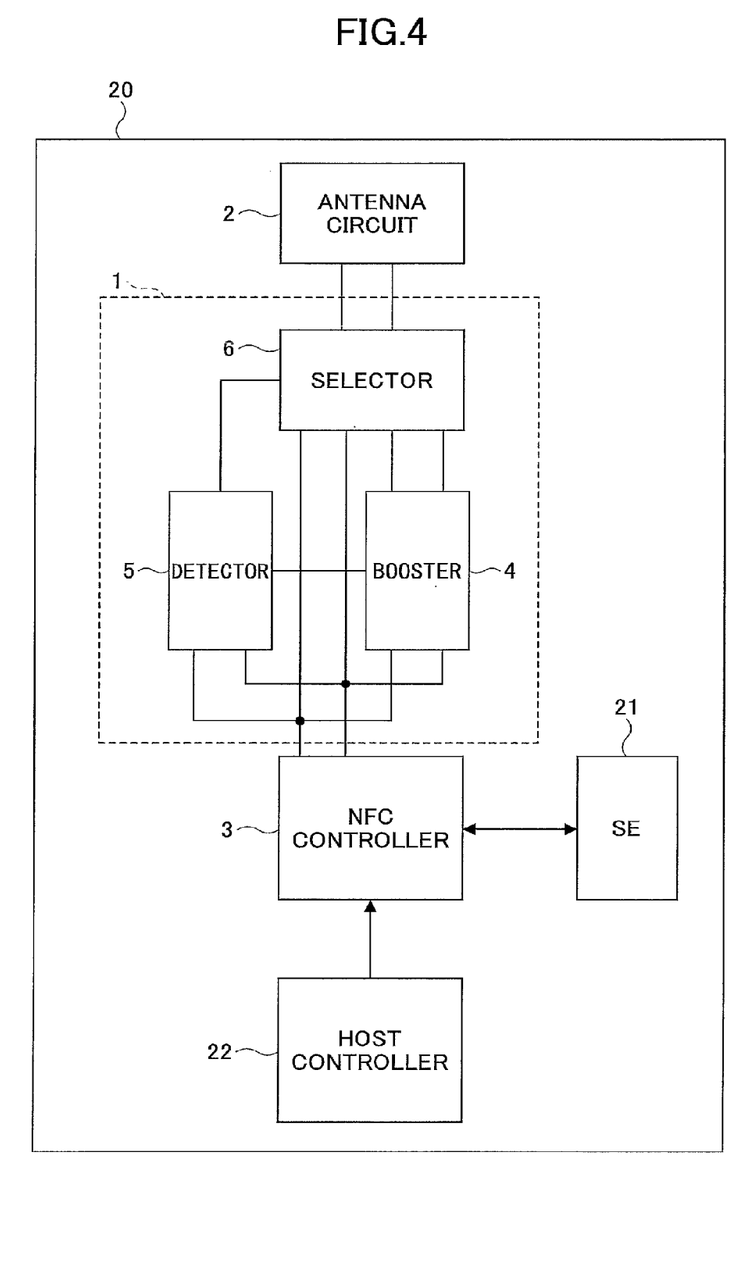
FIG. 4 is a diagram that illustrates an example of a configuration of a mobile device according to the first embodiment.

In the following, a first embodiment of the present invention will be described with reference to FIG. 1 to FIG. 4. FIG. 1 is a diagram that illustrates an example of a circuit configuration of a wireless communication apparatus according to the first embodiment. FIG. 2 is a diagram that illustrates an example of a circuit configuration of a detector illustrated in FIG. 1. FIG. 3 is a diagram that illustrates the wireless communication apparatus illustrated in FIG. 1 implemented by semiconductor integrated circuits. FIG. 4 is a diagram that illustrates an example of a configuration of a mobile device according to the first embodiment.

The wireless communication apparatus 1 according to the first embodiment is provided in a mobile device, for example, a smart phone. The wireless communication apparatus 1 includes a booster 4, a detector 5, and a selector 6, and is connected with an antenna circuit 2 and an NFC controller 3.

The antenna circuit 2 as a transceiver unit receives a wireless signal from a device on the counterpart side (not illustrated), and wirelessly transmits an output signal of the NFC controller 3 via the selector 6.

The NFC controller 3 as a wireless communication unit executes communication based on the NFC standards. The NFC controller 3 receives and transmits information to be communicated with the device on the counterpart side, depending on two operational modes that are the card emulation mode and the R/W mode. For example, in the card emulation mode, when receiving a signal from the reader/writer as the device on the counterpart side, the NFC controller 3 transmits a predetermined signal (information) as a response. Also, in the R/W mode, the NFC controller 3 transmits a predetermined signal to the device on the counterpart side (an IC card or a reader/writer), and receives a response from the device on the counterpart side.

When the NFC controller 3 operates in the card emulation mode, the booster 4 as an amplifier circuit amplifies an output signal from the NFC controller 3, and amplifies a signal received by the antenna circuit 2 to output to the NFC controller 3. Also, the booster 4 has a function to detect the amplitude of the signal from the antenna circuit 2.

The detector 5 as a determination unit and an amplification control unit detects and determines the operational mode of the NFC controller 3, based on an output signal of the NFC controller 3. If the output signal of the NFC controller 3 is in the R/W mode, the detector 5 takes advantage of the amplitude greater than that in the card emulation mode. In other words, the detector 5 converts the output of the NFC controller 3 into a direct current by a detection circuit, and determines the operational mode by comparing the signal level of the converted direct current with a predetermined threshold (a first threshold). In other words, if it is greater than or equal to the threshold, it is determined as the R/W mode. After having determined the operational mode, the detector 5 applies binarization to the determination result to be a value of "0" or "1", and outputs it as a selection signal to the selector 6 and a control signal to the booster 4.

A specific example of the detector 5 is illustrated in FIG. 2. The detector 5 includes a low-frequency removal circuit 51, an envelope detection circuit 52, an integration circuit 53, a comparator 54, and a reference voltage generation circuit 55.

The low-frequency removal circuit 51 removes DC components from an output signal received as input from the NFC controller 3. Note that the low-frequency removal circuit may be omitted if the output signal of the NFC controller 3 has no offset of a DC voltage.

The envelope detection circuit 52 detects envelopes for the output of the low-frequency removal circuit 51. The integration circuit 53 integrates the output of the envelope detection circuit 52 to make it a direct current.

The comparator 54 compares the output of the integration circuit 53 with a reference voltage (a first threshold) that is output from the reference voltage generation circuit 55, executes binarization to make it a value of "0" or "1", and outputs it to the selector 6 and the booster 4.

Also, as a result of determination of the operational mode, if it turns out be the R/W mode that does not use the booster 4, the detector 5 stops supplying power to the booster 4 (or stops the operation of the booster 4); or if it turns out be the card emulation mode, the detector 5 starts supplying power to the booster 4. Note that the booster 4 does not stop the entire circuitry even if the power supply is stopped, but continues to operate the function to detect the amplitude of a signal from the antenna circuit 2. In other words, the booster 4 just needs to stop the circuitry relating to the amplification function at least.

If a selection signal output from the detector 5 represents the R/W mode, the selector 6 as a selection unit switches to (or selects) the signal output from the NFC controller 3, to output the signal as it is (namely, without going into the booster 4 to bypass it) to the antenna circuit 2. In other words, the selector 6 selects and decides the signal, based on a determination result by the determination unit. In other words, the selector 6 functions as a decision unit.

Also, the selector 6 is constituted with, for example, a PIN (P-Intrinsic-N) diode or an analog switch. In this case, for example, a switch is placed on a path bypassing the booster 4, and turned on in the R/W mode, or turned off in the card emulation mode or in a standby mode, which will be described later. Of course, the selector 6 is not limited to a switch, but may be a selector circuit that can select an analog signal.

Operations of the wireless communication apparatus 1 illustrated in FIG. 1 will be described. First, in the default state, the selector 6 receives a signal on the side via the booster 4. Then, when operating in the card emulation mode, if the booster 4 detects the amplitude of a signal from a reader/writer, the booster 4 starts an amplification operation, outputs the amplified signal to the NFC controller 3, and transmits a response from the NFC controller 3 to the antenna circuit 2 via the booster 4. Also, upon detecting the amplitude of the signal from the reader/writer, the booster 4 outputs a signal indicating that the amplification operation is being executed, to the detector 5. This signal is output until the amplitude of the signal from the reader/writer is not detected anymore. At this moment, the detector 5 detects that the amplitude of the output of the NFC controller 3 is less than a threshold, and hence, the selector 6 does not switch to the bypass side.

When communicating with a contactless IC card by NFC, the contactless IC card does not have a power source, and operates on power supplied from a reader/writer. In other words, in the card emulation mode, a signal to supply power is continuously input into the contactless IC card from the reader/writer until a session of communication completes. Therefore, the NFC controller 3 transitions to the card emulation mode upon recognizing a signal from the reader/writer, and after having responded to the reader/writer, at a timing when the power supply from the reader/writer stops, transitions from the card emulation mode to the standby (wait) mode.

On the other hand, when operating in the R/W mode, the NFC controller 3 transitions from the standby mode to the R/W mode, and transmits a predetermined signal to the IC card or the like. At this moment, the detector 5 determines that it is the R/W mode because the amplitude of the output of the NFC controller 3 is greater than or equal to the threshold. Then, the detector 5 stops the power supply to the booster 4 except for a certain part, and has the selector 6 switch (to the side bypassing the booster 4) so as to output the output of the NFC controller 3 directly to the antenna circuit 2. The NFC controller 3 continues to output the signal to supply power to the IC card or the like. Then, when the NFC controller 3 receives a response from the IC card or the like, stops supplying the power to the IC card or the like, and transitions to the standby mode. Then, the detector 5 receives the output of the NFC controller 3 that has become less than the threshold, and hence, the detector 5 has the selector 6 switch to the side via the booster 4. At this moment, the power supply to the booster 4 is resumed.

In the R/W mode, if the counterpart is an IC card (the card emulation mode), it is often the case that measures are taken on the counterpart side to satisfy the standards, such as amplifying a signal and enlarging the antenna. Therefore, communication is not much influenced even if the signal output from the reader/writer side is not amplified. Also, if the counterpart is a reader/writer (the R/W mode), data reads and writes are executed on both sides. Therefore, it is unlikely that the communication time is short as a time at a ticket gate at a station, and hence, it is possible to position both sides close enough to be in a range where secure communication can be made, and to maintain the state until the communication completes. Therefore, in the R/W mode, communication is executed without going via the booster 4.

FIG. 3 is an example in which the circuit in FIG. 1 is implemented with multiple semiconductor integrated circuits. In FIG. 3, the booster 4 and the detector 5 constitutes a single semiconductor integrated circuit 10, but the semiconductor integrated circuit 10 does not include the selector 6. In this case, the selector 6 may be another integrated circuit, or may be a discrete circuit. In FIG. 3, the NFC controller 3 is implemented as an individual semiconductor integrated circuit.

The voltage in the antenna circuit 2 is made greater than that of the output signal of the NFC controller 3, by a resonance circuit. Configured as in FIG. 3, the voltage resistance of the switch constituting the selector 6 can be matched with the voltage of the antenna circuit 2, and the voltage resistance of the semiconductor integrated circuit 10 can be decreased (namely, the voltage resistance of the semiconductor integrated circuit 10 does not need to match that of the antenna circuit 2).

FIG. 4 illustrates an example of a configuration of the mobile device 20 according to an embodiment. As examples of the mobile device 20, smart phones, tablet terminals, and mobile game devices may be considered. The mobile device 20 includes a wireless communication apparatus 1, an antenna circuit 2, an NFC controller 3, an SE 21, and a host controller 22.

The SE 21 executes encryption/decryption of information communicated by the wireless communication apparatus 1, stores information that has been secured and information to be secured such as an ID, a password, a balance, a departure station, etc., and executes other security-related processes.

The host controller 22 includes a CPU (Central Processing Unit) and memories such as a ROM (Read-Only Memory) and a RAM (Random Access Memory), and controls the mobile device 20 as a whole.

In the card emulation mode, for example, if the mobile device 20 illustrated in FIG. 4 receives a signal from an external reader/writer, the NFC controller 3 receives required information in an encrypted state from the SE 21, and transmits it to the reader/writer.

On the other hand, in the R/W mode, for example, following a command from the host controller 22, the NFC controller 3 transmits a signal to the counterpart side such as an IC card, and upon receiving a response from the counterpart side, executes a process such as decryption by the SE 21 if necessary, and outputs it to the host controller 22.

According to the embodiment, the detector 5 determines whether the operational mode of the NFC controller 3 is the R/W mode, based on a signal output by the NFC controller 3. Then, if the detector 5 determines that it is the R/W mode, this makes the selector 6 select the side bypassing the booster 4, for transmission from the antenna circuit 2. In this way, the booster 4 is used only in the card emulation mode, and the booster 4 does not need to correspond to the R/W mode. Therefore, the circuit complexity and the circuit size increase can be avoided, and also while avoiding the cost increase, communication can be performed in multiple operational modes.

Also, if the detector 5 has the selector 6 bypass the booster 4 to execute transmission from the antenna circuit 2, the power supply to the booster 4 is stopped. In this way, the booster 4 does not need to operate all the time, and power consumption can be reduced.

Also, if the detector 5 determines that a signal output by the NFC controller 3 is greater than or equal to a predetermined threshold, the selector 6 selects the side bypassing the booster 4, for transmission from the antenna circuit 2. In this way, the selection signal to the selector 6 can be generated from an output signal level that changes depending on the operational mode of the NFC controller 3. Therefore, the detector can be implemented with a simple circuit configuration.

Also, the booster 4 is implemented in a semiconductor integrated circuit, and the selector 6 is not included in the semiconductor integrated circuit. In this way, the voltage resistance of the semiconductor integrated circuit including the booster 4 does not need to be raised.

Also, since the mobile device 20 includes the wireless communication apparatus 1, the antenna can be downsized in a smart phone or the like, while implementing both functions of the card emulation mode and the R/W mode at a reduced cost. In the card emulation mode, a mobile device such as a smart phone having a comparatively small antenna, needs to satisfy a performance requirement that is equivalent to that of a simplex contactless IC card in which a comparatively larger space is available for installing an antenna.

Therefore, the mobile device may need the booster 4. On the other hand, in the R/W mode, the mobile device can be positioned close to a communication counterpart such as a contactless IC card in a range where communication can be made with a small antenna, and the booster 4 may not be necessarily required. Focusing on this point, the wireless communication apparatus 1 in the embodiment is installed in the mobile device 20, which is also effective in terms of the cost.

Second Embodiment

Figure 5:
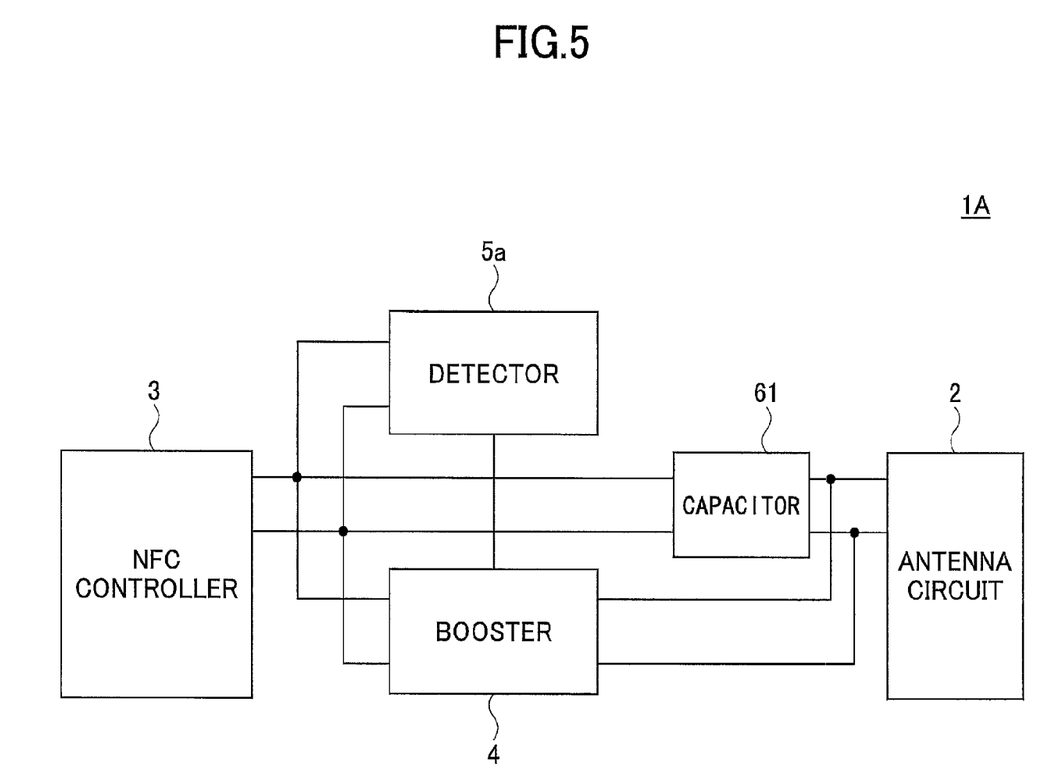
FIG. 5 is a diagram that illustrates an example of a circuit configuration of a wireless communication apparatus according to a second embodiment.

Next, a second embodiment of the present invention will be described with reference to FIG. 5 and FIGS. 6A-6G. Note that the same parts as in the first embodiment described above are assigned the same codes, and their description is omitted. FIG. 5 is a diagram that illustrates an example of a circuit configuration of a wireless communication apparatus according to the second embodiment. FIGS. 6A-6G are waveform diagrams that illustrate an example of operations of the wireless communication apparatus illustrated in FIG. 5.

As illustrated in FIG. 5, the wireless communication apparatus 1A according to the present embodiment has a configuration in which a capacitor 61 as a passive element is inserted on a path not going via the booster 4 (bypassing path) between the antenna circuit 2 and the NFC controller 3, which differs from the first embodiment. In other words, the capacitor 61 functions as a decision unit. Note another passive element, for example, a diode, may be considered as long as it has substantially the same function as the capacitor, which will be described later.

The capacitor 61 is set to have an impedance higher than the output impedance of the NFC controller 3 at a wireless communication frequency used in the wireless communication apparatus 1, for example, 13.56 MHz. Also, the electrostatic capacitance of the capacitor 61 is set so that the response time of circuit takes a value, for example, within a range specified in communication standards used in the wireless communication apparatus 1A. For example, for a frequency of 13.56 MHz used in the NFC standards, it is about several hundred pF to several nF.

Figure 6A:
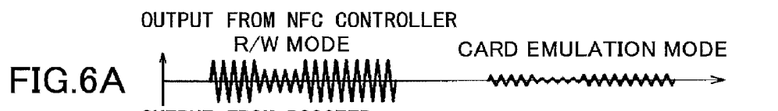
FIGS. 6A-6G are waveform diagrams that illustrate an example of operations of the wireless communication apparatus illustrated in FIG. 5.

Operations of the wireless communication apparatus 1A in the embodiment will be described with reference to waveform diagrams of FIGS. 6A-6G. FIGS. 6A-6G illustrate waveform examples of both the R/W mode and the card emulation mode. FIG. 6A illustrates output waveforms from the NFC controller 3. Note that it is assumed in FIG. 6A that the capacitor 61 is not inserted (connected). The output waveform from the NFC controller 3 illustrates, as described in the first embodiment, that the amplitude is smaller in the card emulation mode than in the R/W mode.

Figure 6B:
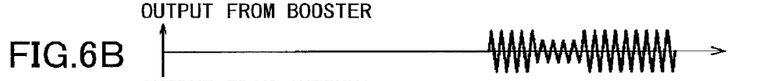

FIG. 6B illustrates waveforms output from the booster 4, namely, the antenna circuit 2 side. Note that it is assumed in FIG. 6B that no radio wave is received by the antenna circuit 2. In FIG. 6B, no waveform appears in the R/W mode because the booster 4 is not used. In the card emulation mode, the amplitude is greater than in FIG. 6A due to amplification by the booster 4.

Figure 6C:
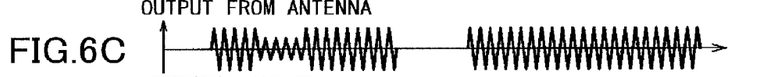

FIG. 6C illustrates a waveform transmitted as a radio wave from the antenna circuit 2 in the R/W mode, and a waveform received as a radio wave by the antenna circuit 2 in the card emulation mode.

Figure 6D:
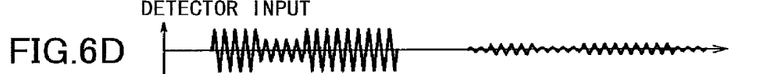

FIG. 6D illustrates input waveforms of the detector 5a. Note that the configuration of the detector 5a may be the same as the configuration in FIG. 2. However, the output of the detector 5a is output only to the booster 4. In the R/W mode, the waveform illustrated in FIG. 6A is input. In the card emulation mode, although a signal output from the antenna circuit 2 to the NFC controller 3 primarily goes via the booster 4, waveforms illustrated in FIGS. 6B and 6C are input into the detector 5a via the capacitor 61. However, as described above, since the impedance of the capacitor 61 is set higher than the output impedance of the NFC controller 3, the waveform output from the antenna circuit 2 side via the capacitor 61 is attenuated, and the amplitude is decreased.

Figure 6E:
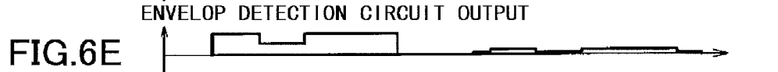

FIG. 6E illustrates output waveforms of the envelope detection circuit 52. In other words, a waveform obtained by applying envelope detection to the waveform illustrated in FIG. 6D is output.

Figure 6F:
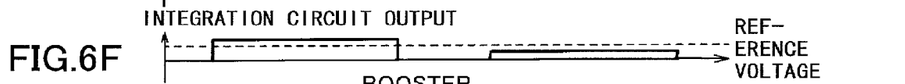

FIG. 6F illustrates output waveforms of the integration circuit 53. In other words, a direct-current waveform obtained by integrating the waveform illustrated in FIG. 6E is output.

Figure 6G:
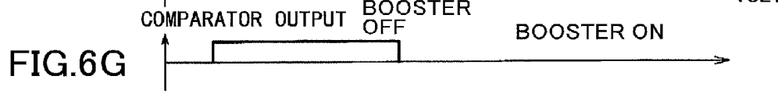

FIG. 6G illustrates output waveforms of the comparator 54. In other words, a high level is output if the waveform illustrated in FIG. 6F is higher than a reference voltage, or a low level is output if it is lower. If it is the high level, it is determined as the R/W mode, and the booster 4 is turned off; or if it is the low level, it is determined as the card emulation mode, and the booster 4 is turned on.

In the embodiment, even if the path bypassing the booster 4 is not cut off by a switch or the like in the card emulation mode, the capacitor 61 operates to attenuate the amplitude of a signal that goes through the capacitor 61 from one terminal side (the antenna circuit 2 side) to the other terminal side (the NFC controller 3 side), to prevent the detector 5a from malfunctioning. In other words, a decision is made to have the signal go via the booster 4. Configured to operate as described above, the detector 5a only controls the booster 4 in the embodiment.

According to the embodiment, since the configuration includes the capacitor 61 inserted on the path not going via the booster 4, an analog switch or the like does not need to be used, and a lower cost can be achieved.

Also, since the impedance of the capacitor 61 is higher than the output impedance of the NFC controller 3, a signal going through the capacitor 61 from one terminal side to the other terminal side can be attenuated greatly, and a signal going through from the other terminal side to the one terminal side can be hardly attenuated. Therefore, it is possible to decide that the path to be taken is the path via the booster 4 in the card emulation mode, or the path not going via the booster 4 in the R/W mode.

Third Embodiment

Figure 7:
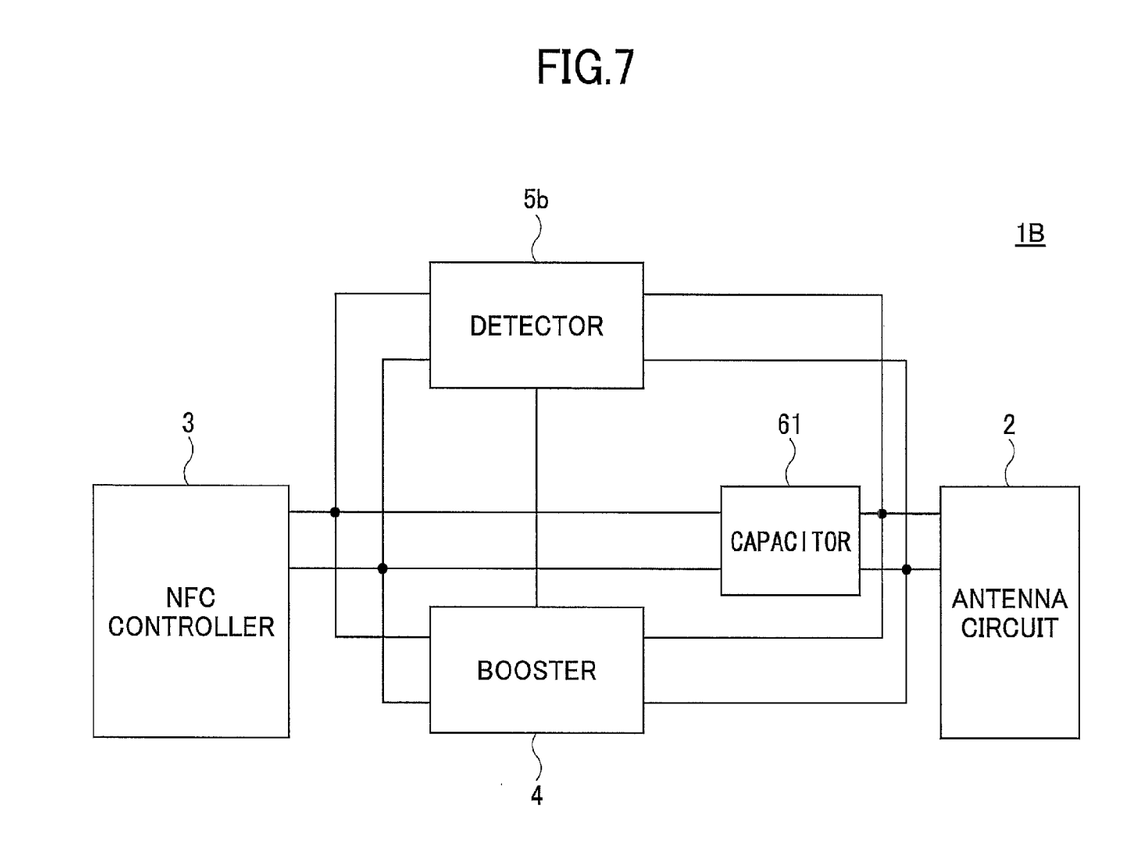
FIG. 7 is a diagram that illustrates an example of a circuit configuration of a wireless communication apparatus according to a third embodiment.
Figure 8:
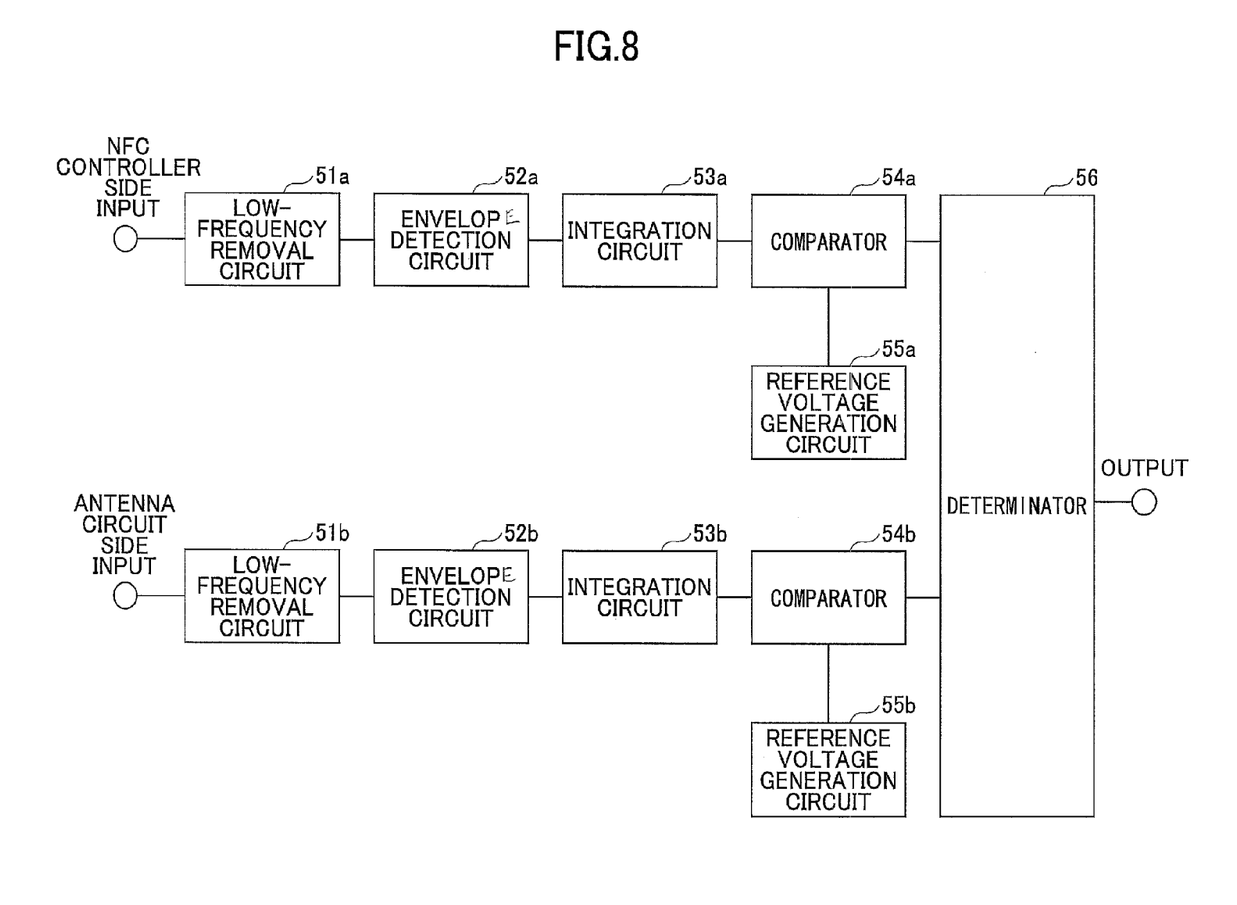
FIG. 8 is a diagram that illustrates an example of a circuit configuration of a detector illustrated in FIG. 7.
Figure 9A:
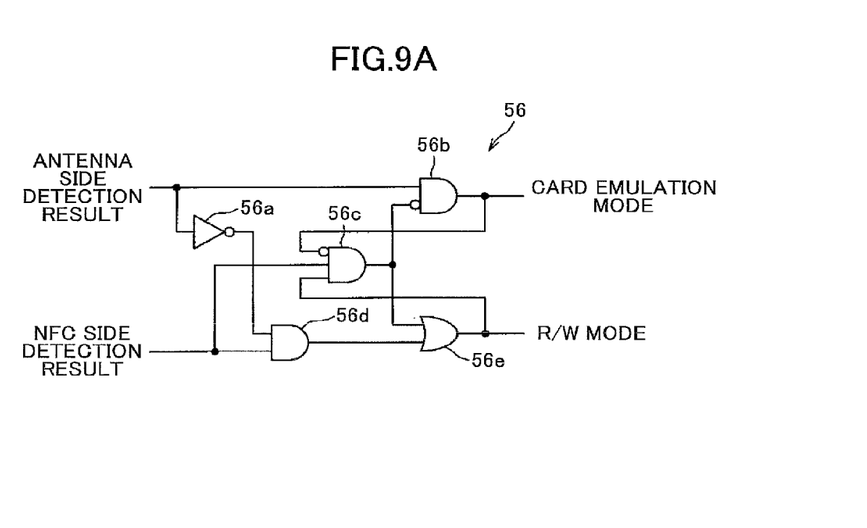
FIG. 9A is a diagram that illustrates an example of a circuit configuration of a determinator illustrated in FIG. 8.
Figure 9B:
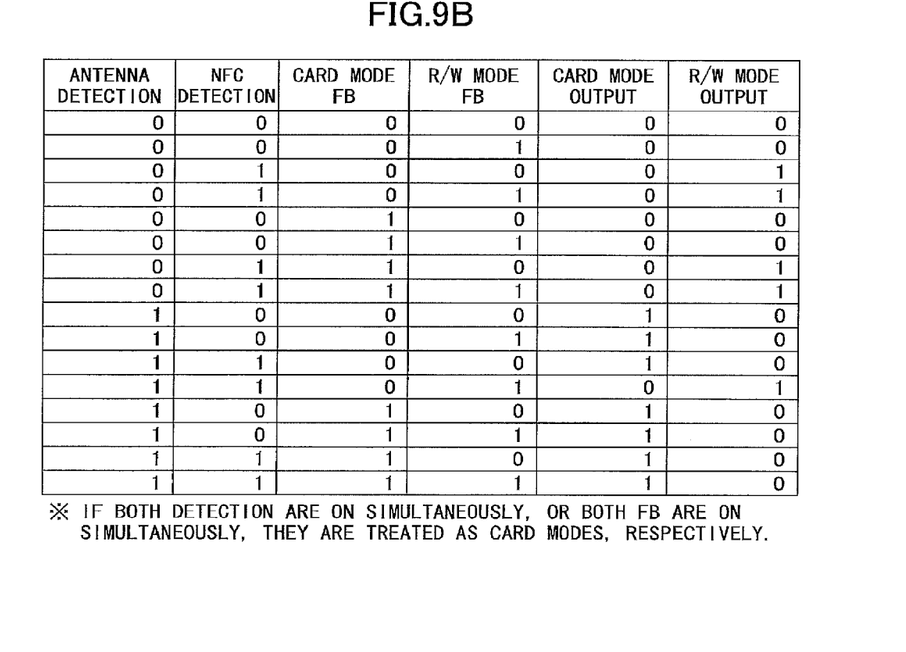
FIG. 9B is a truth table of the circuit illustrated in FIG. 9A.

Next, a third embodiment of the present invention will be described with reference to FIG. 7 to FIGS. 10A-10M. Note that the same parts as in the first and second embodiments described above are assigned the same codes, and their description is omitted. FIG. 7 is a diagram that illustrates an example of a circuit configuration of a wireless communication apparatus according to the third embodiment. FIG. 8 is a diagram that illustrates an example of a circuit configuration of a detector illustrated in FIG. 7. FIG. 9A is a diagram that illustrates an example of a circuit configuration of a determinator illustrated in FIG. 8. FIG. 9B is a truth table of the circuit illustrated in FIG. 9A. FIGS. 10A-10M are waveform diagrams that illustrate an example of operations of the wireless communication apparatus illustrated in FIG. 7.

As illustrated in FIG. 7, a wireless communication apparatus 1B according to the embodiment has additional connection lines to the detector 5b from positions where the antenna circuit 2 is connected, in contrast to FIG. 5. In other words, the signal from the antenna circuit 2 side is input into the detector 5b.

FIG. 8 illustrates a configuration of the detector 5b in the embodiment. As illustrated in FIG. 8, the detector 5b includes a system to process a signal input from the NFC controller 3 (a low-frequency removal circuit 51a, an envelope detection circuit 52a, an integration circuit 53a, a comparator 54a, and a reference voltage generation circuit 55a), a system to process a signal input from the antenna circuit 2 (a low-frequency removal circuit 51b, an envelope detection circuit 52b, an integration circuit 53b, a comparator 54b, and a reference voltage generation circuit 55b), and a determinator 56. The system to process a signal input from the NFC controller 3, and the system to process a signal input from the antenna circuit 2 are two systems simply configured as illustrated in FIG. 2, and the configurations of the individual circuits are virtually the same. However, the reference voltage generation circuit 55a and the reference voltage generation circuit 55b each generate different reference voltages.

The detector 5b determines whether to turn the booster 4 on or off by the determinator 56, based on the output of the comparator 54a in the system to process a signal input from the NFC controller 3, and the output of the comparator 54b in the system to process a signal input from the antenna circuit 2.

The determinator 56 determines the operational mode, based on one of the output of the comparator 54a and the output of the comparator 54b that takes the high level sooner. If the comparator 54a takes the high level sooner, the determinator 56 determines that the NFC controller 3 operates in the R/W mode. If the comparator 54b takes the high level earlier, the determinator 56 determines that access has been made by the external reader/writer, and it operates in the card emulation mode. Also, if the output of the comparator 54a and the output of the comparator 54b take the high level at the same time, the determinator 56 determines that it operates in the card emulation mode.

In other words, the determinator 56 determines the effective operational mode, based on the NFC controller 3 and the external reader/writer, whichever the signal is detected earlier. Also, in the card emulation mode, the determination that it is in the card emulation mode, continues to be effective while the signal from the antenna circuit 2 is being detected (while the amplitude of the signal from the reader/writer is being detected). Also, in the R/W mode, the determination that it is in the R/W mode continues to be effective while the signal from the NFC controller 3 is being detected.

FIG. 9A illustrates an example of a circuit of the determinator 56. FIG. 9B is a truth table of the circuit illustrated in FIG. 9A. The determinator 56 includes a NOT circuit 56a, AND circuits 56b, 56c, and 56d, and an OR circuit 56e.

The NOT circuit 56a receives as input the output of the comparator 54b (antenna side detection result), and outputs the inversion to the first input of the AND circuit 56d. The AND circuit 56b receives as input the output of the comparator 54b (antenna side detection result) and the inversion of the output of the AND circuit 56c, and outputs the logical AND to the AND circuit 56c, which is the output representing the card emulation mode. The AND circuit 56c receives as input the inverted signal of the output of the AND circuit 56b, the output of the comparator 54a (NFC side detection result), and the output of the OR circuit 56e, and outputs the logical AND to the AND circuit 56b and the OR circuit 56e. The AND circuit 56d receives as input the output of the NOT circuit 56a and the output of the comparator 54a (NFC side detection result), and outputs the logical AND to the OR circuit 56e. The OR circuit 56e receives as input the output of the AND circuit 56c and the output of the AND circuit 56d, and outputs the logical OR to the AND circuit 56c, which is the output representing the R/W mode. Note that in FIG. 9A, although both the output representing the card emulation mode and the output representing the R/W mode are illustrated, the output representing the R/W mode is used as the output of the determinator 56 in the embodiment.

In the truth table in FIG. 9B, CARD MODE FB represents a path from the output of the AND circuit 56b to the input of the AND circuit 56c. R/W MODE FB represents a path from the output of the OR circuit 56e to the input of the AND circuit 56c. In other words, the circuit illustrated in FIG. 9A can hold a previous state (the R/W mode or the card emulation mode). Also, in the antenna side detection result (ANTENNA DETECTION) and the NFC side detection result (NFC DETECTION), "0" represents the low level, and "1" represents the high level. Also, in the output representing the card emulation mode (CARD MODE OUTPUT) and the output representing the R/W mode (R/W MODE OUTPUT), "0" represents a determination that it is not the corresponding mode, and "1" represents a determination that it is the corresponding mode.

Figure 10A:
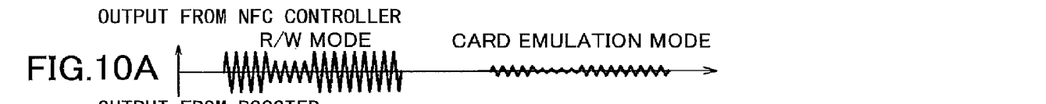
FIGS. 10A-10M are waveform diagrams that illustrate an example of operations of the wireless communication apparatus illustrated in FIG. 7.
Figure 10B:
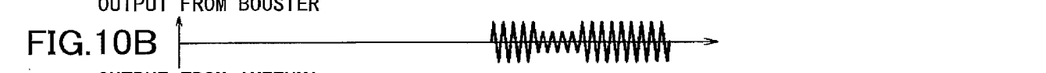
Figure 10C:
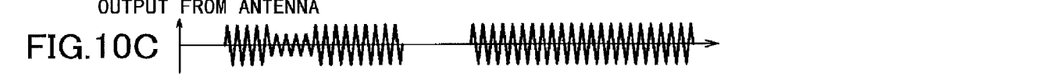

Operations of the wireless communication apparatus 1A in the embodiment will be described with reference to the waveform diagram of FIGS. 10A-10M. FIGS. 10A-10M illustrate waveform examples of both the R/W mode and the card emulation mode. FIGS. 10A-10C are the same as FIGS. 6A-6C.

Figure 10D:
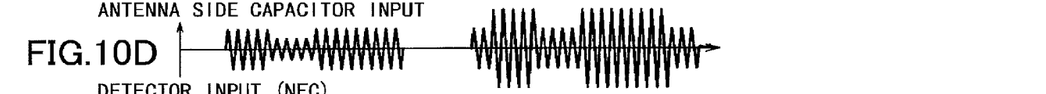

FIG. 10D illustrates waveforms of the antenna circuit 2 side of the capacitor 61. In the R/W mode, it is the same as the waveform of FIG. 10C. However, in the card emulation mode, the amplitude of a received signal level may be greater than that in the second embodiment, due to a shorter distance to the external reader/writer or the like. In such a case, the amplitude may not be attenuated enough by the capacitor 61, and there is a likelihood that the detector 5 or 5a in the first or second embodiment malfunctions. To cope with such a problem, the present embodiment has the signal of the antenna circuit 2 side input into the detector 5b, to determine the operational mode.

Figure 10E:
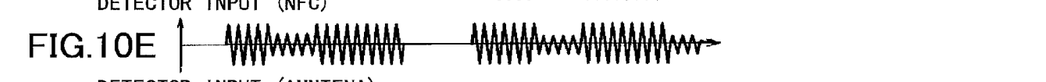

FIG. 10E illustrates input waveforms of the NFC controller 3 side of the detector 5b. In the R/W mode, substantially the same waveform as FIG. 10A is input. On the other hand, in the card emulation mode, as described above, the amplitude may not be sufficiently attenuated by the capacitor 61, and the signal is input with a greater amplitude compared to FIG. 6D.

Figures 10F, 10G:
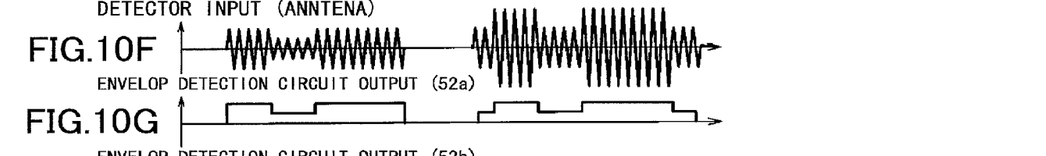

FIG. 10F illustrates input waveforms of the antenna circuit 2 side of the detector 5b. In the R/W mode, substantially the same waveform as FIG. 10D is input. In the card emulation mode, substantially the same waveform as FIG. 10D is input.

FIG. 10G illustrates output waveforms of the envelope detection circuit 52a. FIG. 10I illustrates output waveforms of the integration circuit 53a. FIG. 10K illustrates output waveforms of the comparator 54a. These operates in substantially the same way as in FIGS. 6A-6G. However, since the amplitudes of the input waveforms are great enough to be higher than the reference voltage even in the card emulation mode, the output of the comparator 54a takes the high level.

Figure 10H:
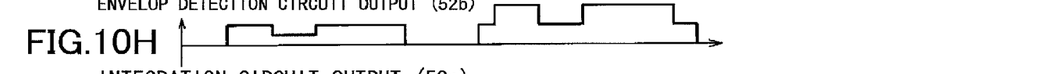
Figure 10I:
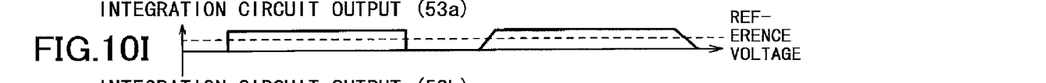
Figure 10J:
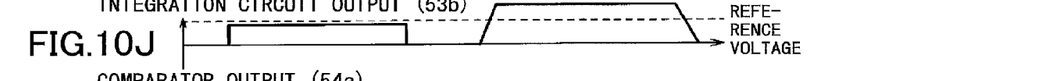
Figure 10K:
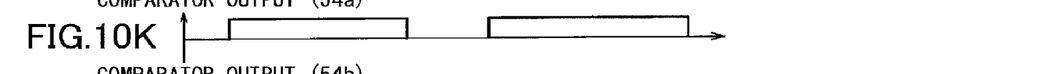
Figure 10L:
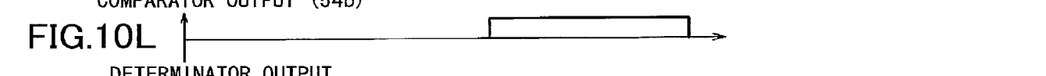

FIG. 10H illustrates output waveforms of the envelope detection circuit 52b. FIG. 10J illustrates output waveforms of the integration circuit 53b. FIG. 10L illustrates output waveforms of the comparator 54b. Although these basically operate in the same way as illustrated in FIGS. 6A-6G, the output of the comparator 54a takes the level in the R/W mode because the reference voltage generated by the reference voltage generation circuit 55b is set to a voltage (second threshold) higher than the reference voltage generated by the reference voltage generation circuit 55a.

Figure 10M:
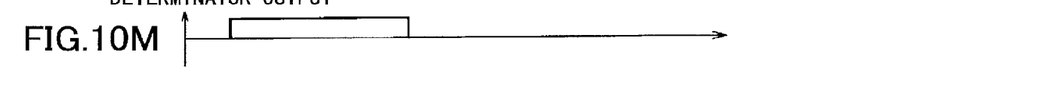

FIG. 10M illustrates the output of the determinator 56. In other words, based on the output waveform of the comparator 54a (FIG. 10K) and the output waveform of the comparator 54b (FIG. 10L), the high level is output in the R/W mode, or the low level is output in the card emulation mode. Then, if it is the high level, the booster 4 is turned off, or if it is the low level, the booster 4 is turned on.

In other words, in the R/W mode in the circuit of FIG. 9A, since only the comparator 54a (NFC side detection result) takes "1", it is determined as the R/W mode, and the R/W mode output is "1". On the other hand, in the card emulation mode in the circuit of FIG. 9A, since the comparator 54a (NFC side detection result) and the comparator 54b (antenna side detection result) output "1", it is determined as the card emulation mode, and the R/W mode output is "0".

Note that the waveforms of FIGS. 10A-10M illustrate a case where the comparator 54a (NFC side detection result) and the comparator 54b (antenna side detection result) output "1" at the same time. However, comparing the signal from the antenna circuit 2 with the signal that reaches the NFC controller 3 side via the capacitor 61, in general, a detection result based on the signal from the antenna circuit 2 (the comparator 54b) becomes "1" earlier. Therefore, in practice, it is often the case that it is determined as the card emulation mode by the output of the comparator 54b that has become "1" earlier. Also, by having the determinator 56 illustrated in FIG. 8 operate as the example in FIG. 9A and FIG. 9B, it can be determined as the card emulation mode if both the detection results are "1".

In other words, the detector 5b (amplification control unit) determines whether to activate the booster 4 (amplifier circuit), based on a result of comparing the signal output by the NFC controller 3 (wireless communication unit) with the predetermined first threshold, and a result of comparing the signal output by the antenna circuit 2 (transceiver unit) with the predetermined second threshold.

According to the embodiment, the detector 5b determines whether to turn on the booster 4, based on the signal output by the NFC controller 3 and the signal output by the antenna circuit 2. Therefore, it is possible to determine whether to turn on the booster 4 even if a signal having a great amplitude is input from the antenna circuit 2, without malfunctioning.

Also, since the reference voltage generated by the reference voltage generation circuit 55b is set to a voltage higher than the reference voltage generated by the reference voltage generation circuit 55a, it is possible to securely determine that a signal having a great amplitude is input from the antenna circuit 2.

Note that in the embodiment described above, although the configuration is assumed that the selector 6 is not included in the semiconductor integrated circuit 10 as illustrated in FIG. 3, the selector 6 may be included. For example, the booster 4, the detector 5 (5a, 5b), and the selector 6 may be integrated in a single semiconductor integrated circuit. However, in this case, measures need to be taken for the voltage resistance of the antenna circuit 2 as described above.

Also, in the embodiments described above, although the power supply to the booster 4 is stopped when the selector 6 executes transmission from the antenna circuit 2 without going via the booster 4, it is not limited to that. For example, a switch may be provided on the NFC controller 3 side or the selector 6 side of the booster 4, and the switch may be turned off if transmitting from the antenna circuit 2 without going via the booster 4. In short, it is sufficient to prevent the booster 4 from functioning.

Also, the NFC controller 3 may output a signal indicating the operational mode (the R/W mode) directly to the selector 6 and the booster 4. In this case, the operational mode is determined in the NFC controller 3, and the detector 5 is not required.

Also, the present invention is applicable to RFID (including electromagnetic induction, microwave, and UHF-band based communication) other than NFC. In addition, it is applicable to other wireless communication methods as long as they have multiple operational modes.

Further, the present invention is not limited to these embodiments and examples described above, but various variations and modifications may be made without departing from the scope of the present invention.

What is claimed is:

1. A wireless communication apparatus, comprising:
an amplifier circuit configured to amplify a first signal output by a wireless communication circuit that executes wireless communication, and to output the first signal that is amplified to a transceiver;
a decision circuit configured to decide, based on an operational mode of the wireless communication circuit, whether to transmit the first signal from the transceiver via the amplifier circuit, or transmit the first signal from the transceiver without going via the amplifier circuit; and
a determination circuit configured to determine the operational mode of the wireless communication circuit, the determination circuit determining the operational mode based on a third signal obtained by applying envelope detection to the first signal to generate a second signal and by integrating the second signal to generate the third signal.

2. The wireless communication apparatus as claimed in claim 1,
wherein the decision circuit is configured to select, based on the operational mode determined by the determination circuit, whether to transmit the first signal from the transceiver via the amplifier circuit, or transmit the first signal from the transceiver without going via the amplifier circuit.

3. The wireless communication apparatus as claimed in claim 2, wherein the determination circuit determines the operational mode of the wireless communication circuit, based on the first signal output by the wireless communication circuit.

4. The wireless communication apparatus as claimed in claim 2, wherein the determination circuit determines the operational mode by comparing the first signal output by the wireless communication circuit, with a predetermined first threshold.

5. The wireless communication apparatus as claimed in claim 2, further comprising:
an amplification control circuit configured to avoid activating the amplifier circuit in a case where the decision circuit selects to transmit the first signal from the transceiver without going via the amplifier circuit.

6. The wireless communication apparatus as claimed in claim 1, wherein the decision circuit is constituted with a passive element inserted on a path not via the amplifier circuit.

7. The wireless communication apparatus as claimed in claim 6, further comprising:
an amplification control circuit configured to avoid activating the amplifier circuit in a case where the first signal is transmitted from the transceiver without going via the amplifier circuit.

8. The wireless communication apparatus as claimed in claim 7, wherein the amplification control circuit determines whether to activate the amplifier circuit, based on the first signal output by the wireless communication circuit, and a fourth signal output by the transceiver.

9. The wireless communication apparatus as claimed in claim 8, wherein the amplification control circuit determines whether to activate the amplifier circuit, by comparing the first signal output by the wireless communication circuit with a predetermined first threshold, and comparing the fourth signal output by the transceiver with a predetermined second threshold that is different from the predetermined first threshold.

10. The wireless communication apparatus as claimed in claim 1, wherein at least the amplifier circuit and the decision circuit are implemented and integrated in a single semiconductor integrated circuit.

11. The wireless communication apparatus as claimed in claim 1, wherein at least the amplifier circuit is implemented in a semiconductor integrated circuit, and the decision circuit is not included in the semiconductor integrated circuit.

12. The wireless communication apparatus as claimed in claim 1, wherein the third signal is a direct-current signal.

13. The wireless communication apparatus as claimed in claim 1, wherein the determination circuit determines the operational mode of the wireless communication circuit based on a comparison of the third signal and a reference signal.

* * * * *